United States Patent
Tadimeti et al.

(10) Patent No.: US 7,860,116 B2
(45) Date of Patent: Dec. 28, 2010

(54) PROCESSING PACKETS OF A VIRTUAL INTERFACE ASSOCIATED WITH TUNNELS

(75) Inventors: Srinivasa Tadimeti, San Jose, CA (US); Asheesh Jadav, Sunnyvale, CA (US); Kelly Donald Fromm, Newman Lake, WA (US); Keith Michael Bly, Newman Lake, WA (US)

(73) Assignee: Worldwide Packets, Inc., Liberty Lake, WA (US)

( * ) Notice: Subject to any disclaimer, the term of this patent is extended or adjusted under 35 U.S.C. 154(b) by 455 days.

(21) Appl. No.: 11/753,464

(22) Filed: May 24, 2007

(65) Prior Publication Data

US 2008/0291928 A1 Nov. 27, 2008

(51) Int. Cl.
*H04L 12/56* (2006.01)
(52) U.S. Cl. .............. 370/401; 370/228; 370/395.53
(58) Field of Classification Search ............ 370/401, 370/395.53, 389, 392, 216, 217, 218, 225, 370/228
See application file for complete search history.

(56) References Cited

U.S. PATENT DOCUMENTS

| | | | |
|---|---|---|---|
| 6,834,326 B1 * | 12/2004 | Wang et al. ............ 711/114 |
| 7,010,716 B2 | 3/2006 | Yu et al. | |
| 7,126,907 B2 | 10/2006 | Carpini et al. | |
| 7,370,119 B2 | 5/2008 | Provine et al. | |
| 7,406,518 B2 | 7/2008 | Lasserre | |
| 7,477,640 B2 * | 1/2009 | Oguchi et al. ............ 370/389 |
| 7,489,700 B2 * | 2/2009 | Oogushi ............ 370/409 |
| 7,647,422 B2 | 1/2010 | Singh et al. | |
| 2002/0057647 A1 * | 5/2002 | Iino et al. ............ 370/217 |
| 2002/0138628 A1 * | 9/2002 | Tingley et al. ............ 709/227 |
| 2003/0145246 A1 * | 7/2003 | Suemura ............ 714/2 |
| 2004/0210623 A1 * | 10/2004 | Hydrie et al. ............ 709/201 |
| 2005/0091396 A1 * | 4/2005 | Nilakantan et al. ............ 709/232 |
| 2006/0092955 A1 * | 5/2006 | Durbin et al. ............ 370/401 |
| 2008/0031266 A1 * | 2/2008 | Tallet et al. ............ 370/401 |
| 2008/0285437 A1 * | 11/2008 | Polland ............ 370/219 |
| 2008/0291910 A1 | 11/2008 | Tadimeti et al. | |

OTHER PUBLICATIONS

"Provider Backbone Transport of Carrier Ethernet Services—White Paper," Rev. 1.0, *World Wide Packets*, 12 pages (© 2007).
Witters, J., et al., "VPLS Technical Tutorial; Technical Introduction to Multipoint Ethernet Services over MPLS/Technology White Paper," *ALCATEL Telecommunications Review*, 8 Pages (4th Quarter/ 2004).

* cited by examiner

*Primary Examiner*—Brian D Nguyen
(74) *Attorney, Agent, or Firm*—Wells St. John, P.S.

(57) ABSTRACT

Packet switch operating methods and packet switches assign a packet to a virtual interface. The virtual interface is associated with a plurality of tunnels. One of the plurality is designated a primary tunnel configured to accept packets. Other tunnels of the plurality are designated as backup tunnels and are configured to reject packets. The methods and packet switches also determine which of the plurality of tunnels is the primary tunnel and determine a packet switch port associated with the primary tunnel. The methods and packet switches egress the packet via the primary tunnel on the packet switch port associated with the primary tunnel.

24 Claims, 11 Drawing Sheets

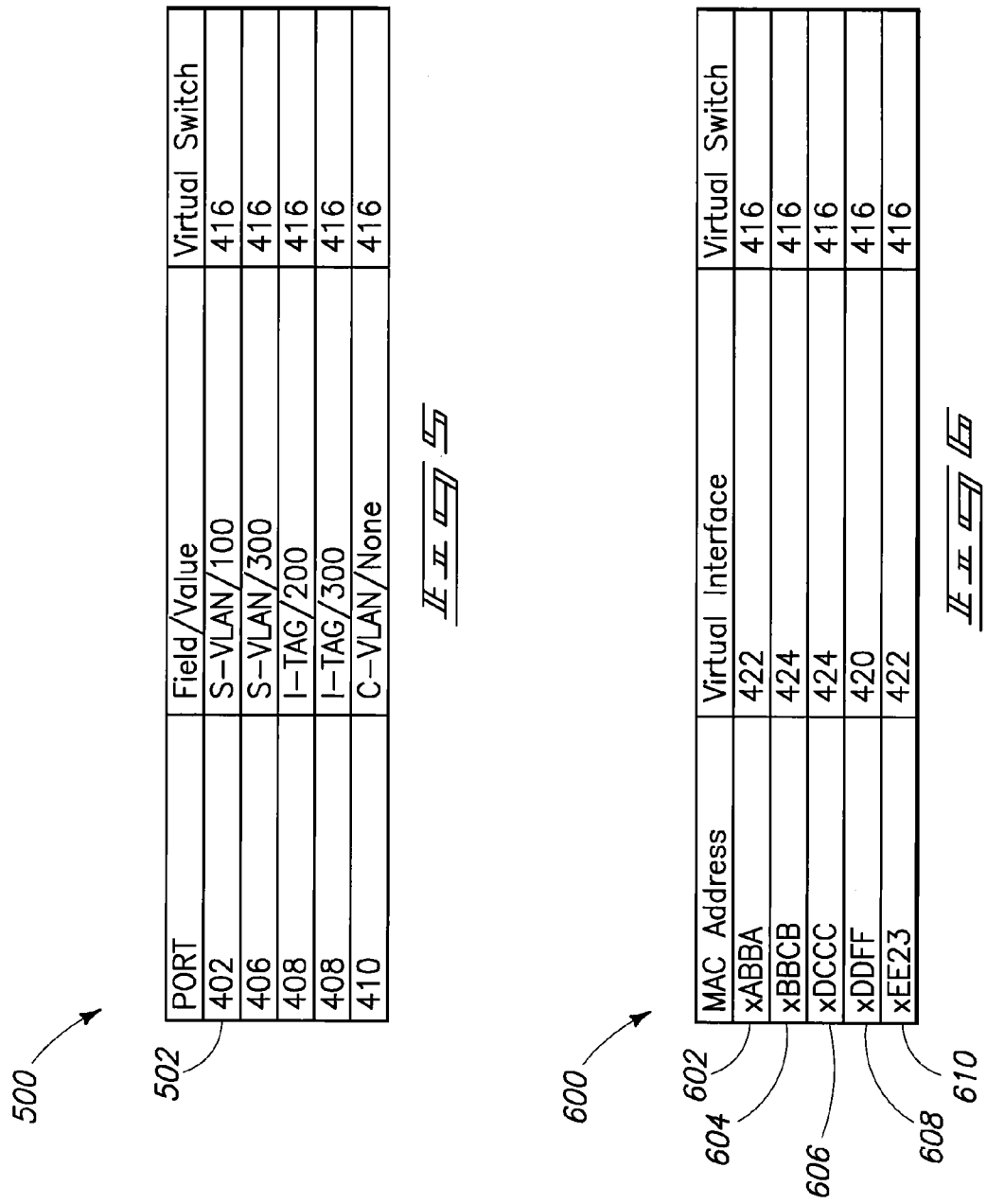

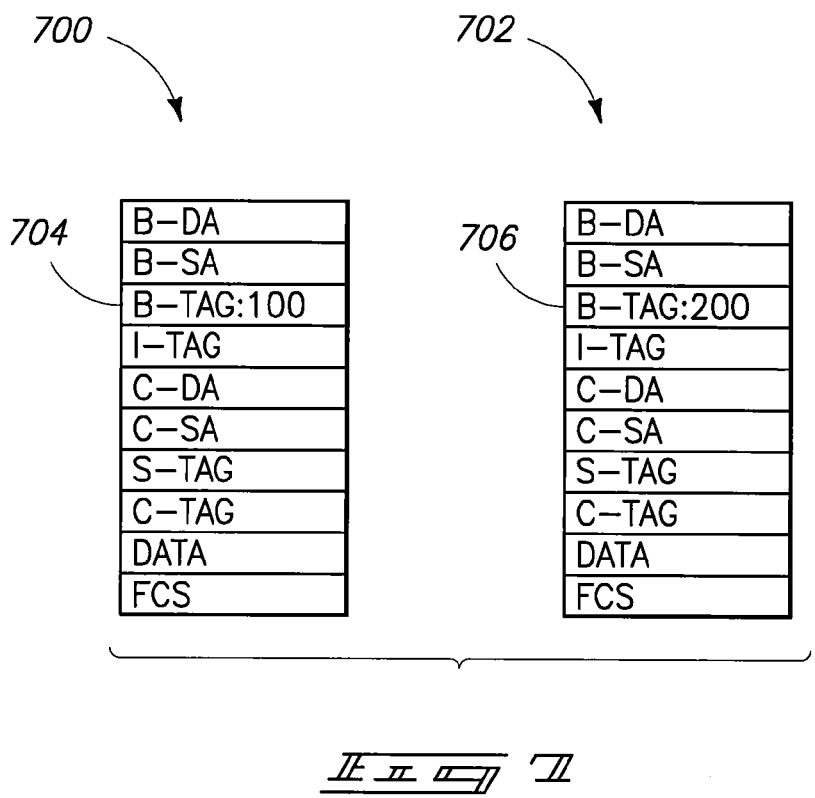
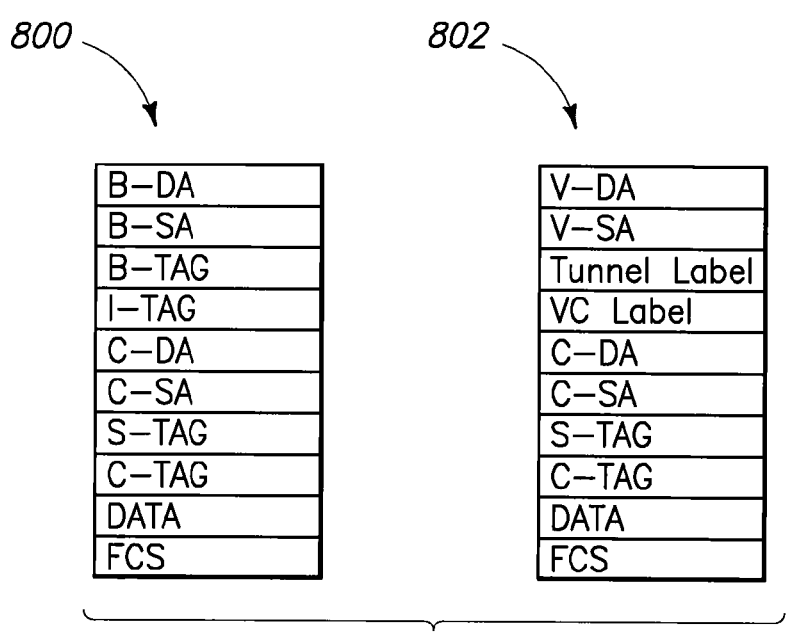

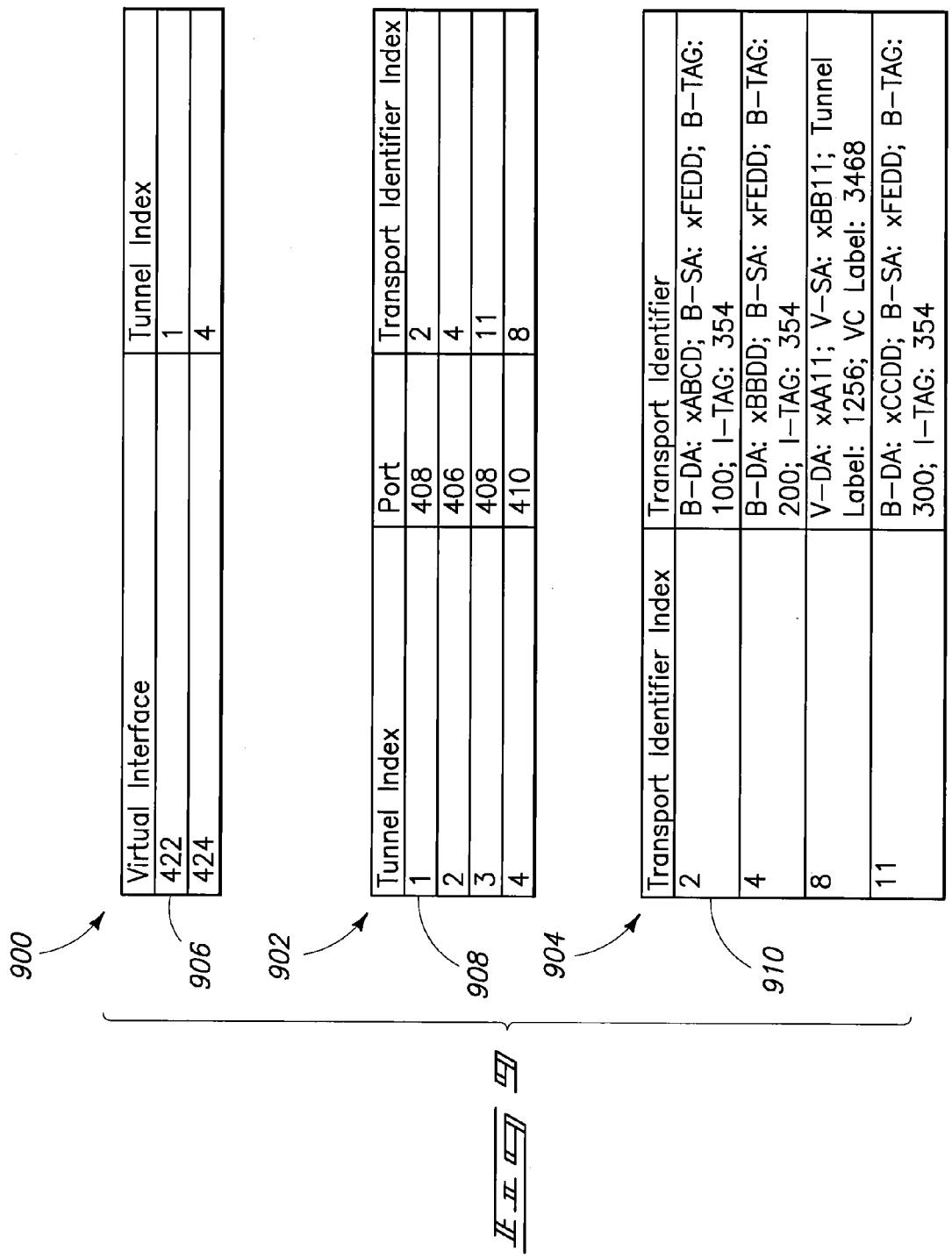

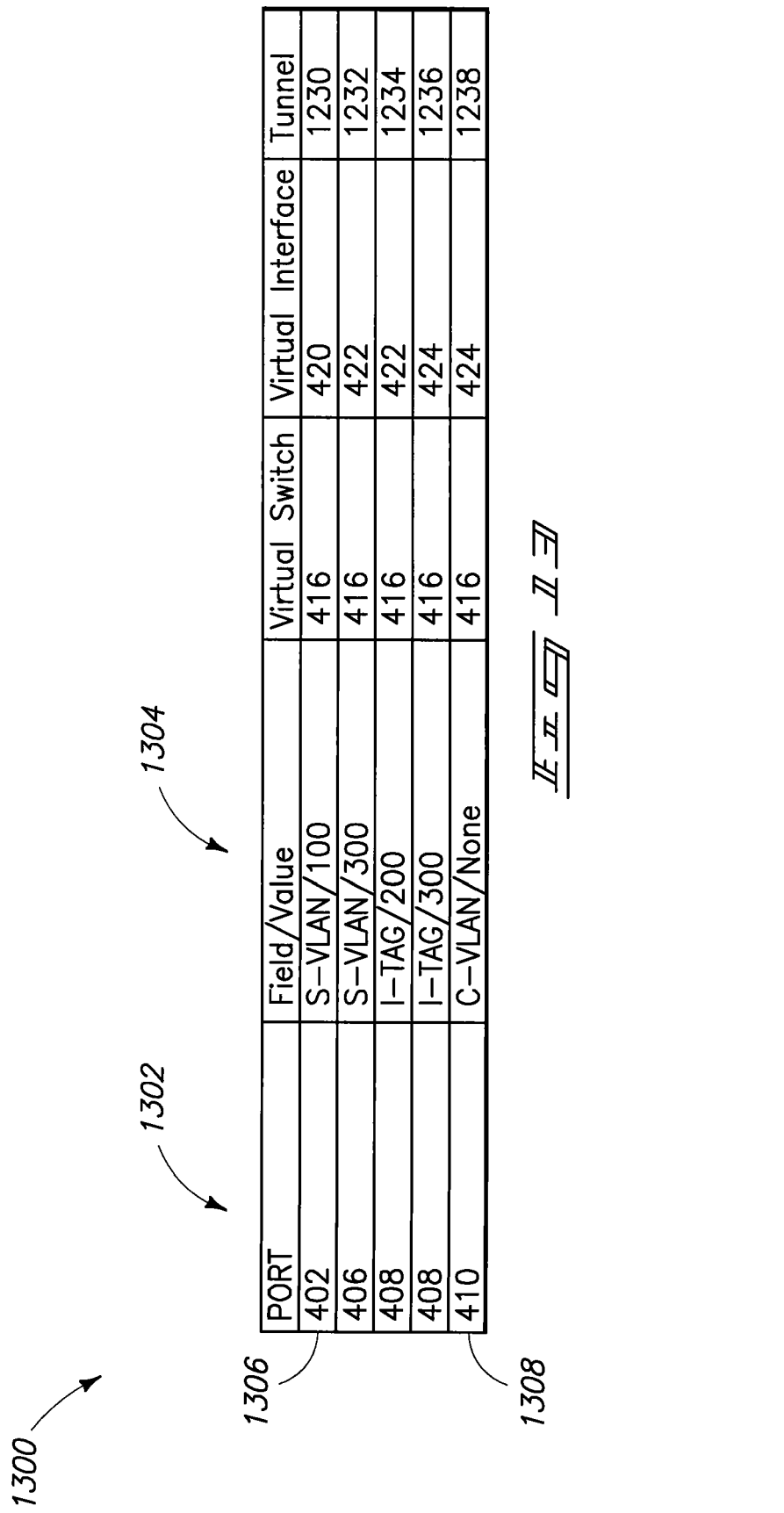

PROCESSING PACKETS OF A VIRTUAL INTERFACE ASSOCIATED WITH TUNNELS

TECHNICAL FIELD

The present invention, in various embodiments, relates to methods and packet switches configured to process packets of a virtual interface associated with tunnels.

BACKGROUND OF THE INVENTION

Conventional packet switches may forward packets using either a primary path or a backup path. Typically, the primary path is an active path that relays packets by default and the backup path is an idle path that does not relay packets unless the primary path goes out of service. If the primary path goes out of service, the backup path may become active and begin relaying packets.

A packet switch may accommodate a plurality of primary paths traversing a single packet switch port. Each of the primary paths may be associated with a different backup path. If a particular one of the primary paths accommodated by the single port goes out of service, the particular primary path becomes inactive and the backup path associated with the particular primary path becomes active. However, when inactivating the particular primary path, the packet switch also inactivates the other primary paths accommodated by the single port even though the other primary paths might not need to be inactivated.

BRIEF DESCRIPTION OF THE DRAWINGS

Preferred embodiments of the invention are described below with reference to the following accompanying drawings.

FIG. 5 illustrates an example of a table that may be used to map packets to a virtual switch.

FIG. 6 illustrates an example of a table that may be used to map packets to a virtual interface.

FIG. 7 illustrates two examples of transport identifier formats.

FIG. 8 illustrates two additional examples of transport identifier formats.

FIG. 9 illustrates examples of tables that may be used to transition a virtual interface from one tunnel to another tunnel.

FIG. 13 illustrates an example of a table that may be used to map packets to tunnels.

DETAILED DESCRIPTION OF THE PREFERRED EMBODIMENTS

A tunnel may serve a useful function in Ethernet networks by relaying Ethernet packets from one endpoint to another endpoint. The tunnel may transit one or more network devices that are intermediate to the tunnel endpoints in relaying packets between the endpoints.

A tunnel may be designated a primary tunnel or a backup tunnel. Backup tunnels may be used to provide redundancy in a network. If a tunnel which is designated a primary tunnel becomes inoperable, a tunnel previously designated as backup may become the primary tunnel and may commence relaying packets effective to minimize service interruptions.

In some cases, more than one backup tunnel may be associated with a single primary tunnel. In these cases, if the primary tunnel and one of the backup tunnels are inoperable, another backup tunnel may become the primary tunnel.

Figure 1:
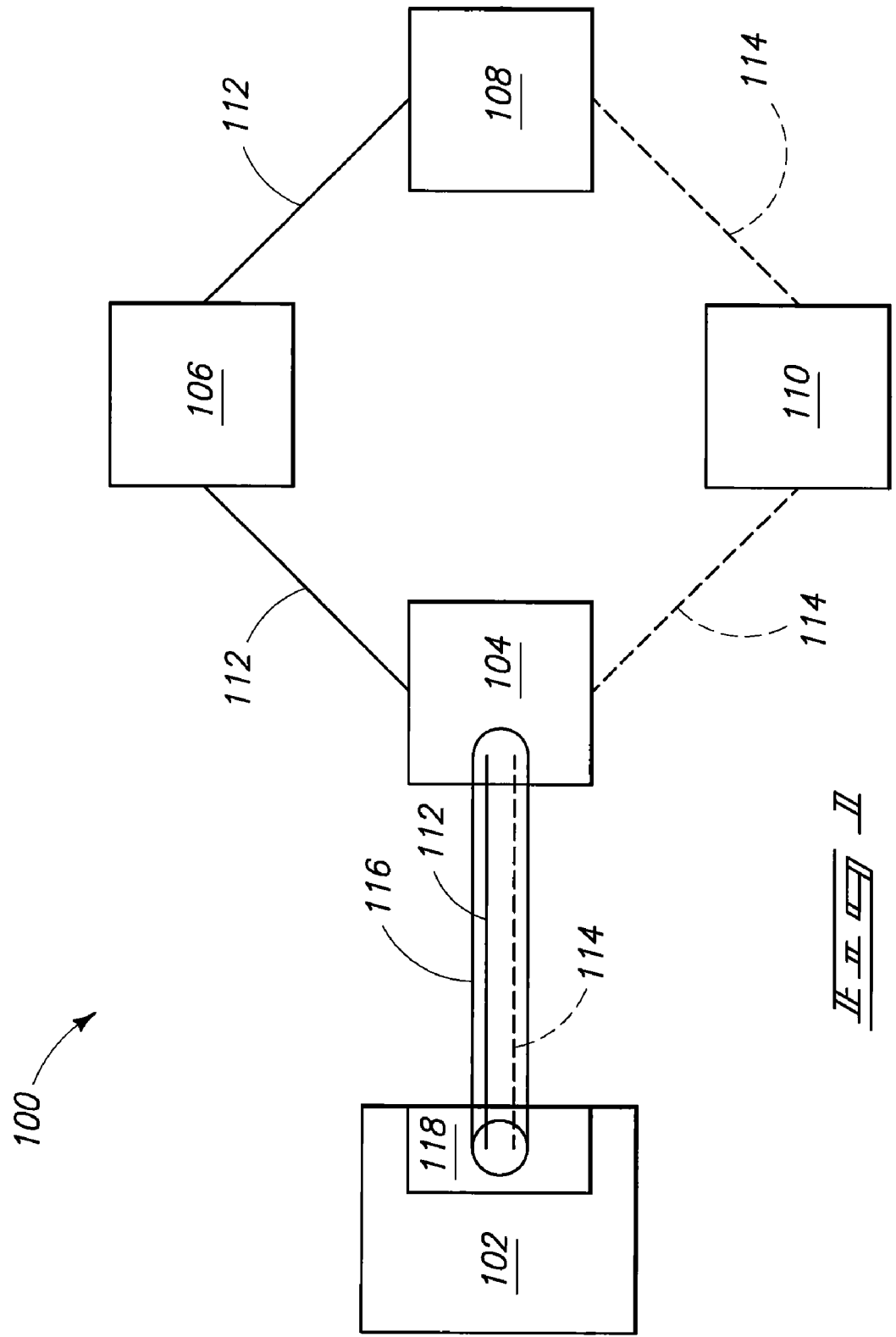
FIG. 1 illustrates a logical representation of a network including two tunnels associated with a port of a packet switch.
Figure 2:
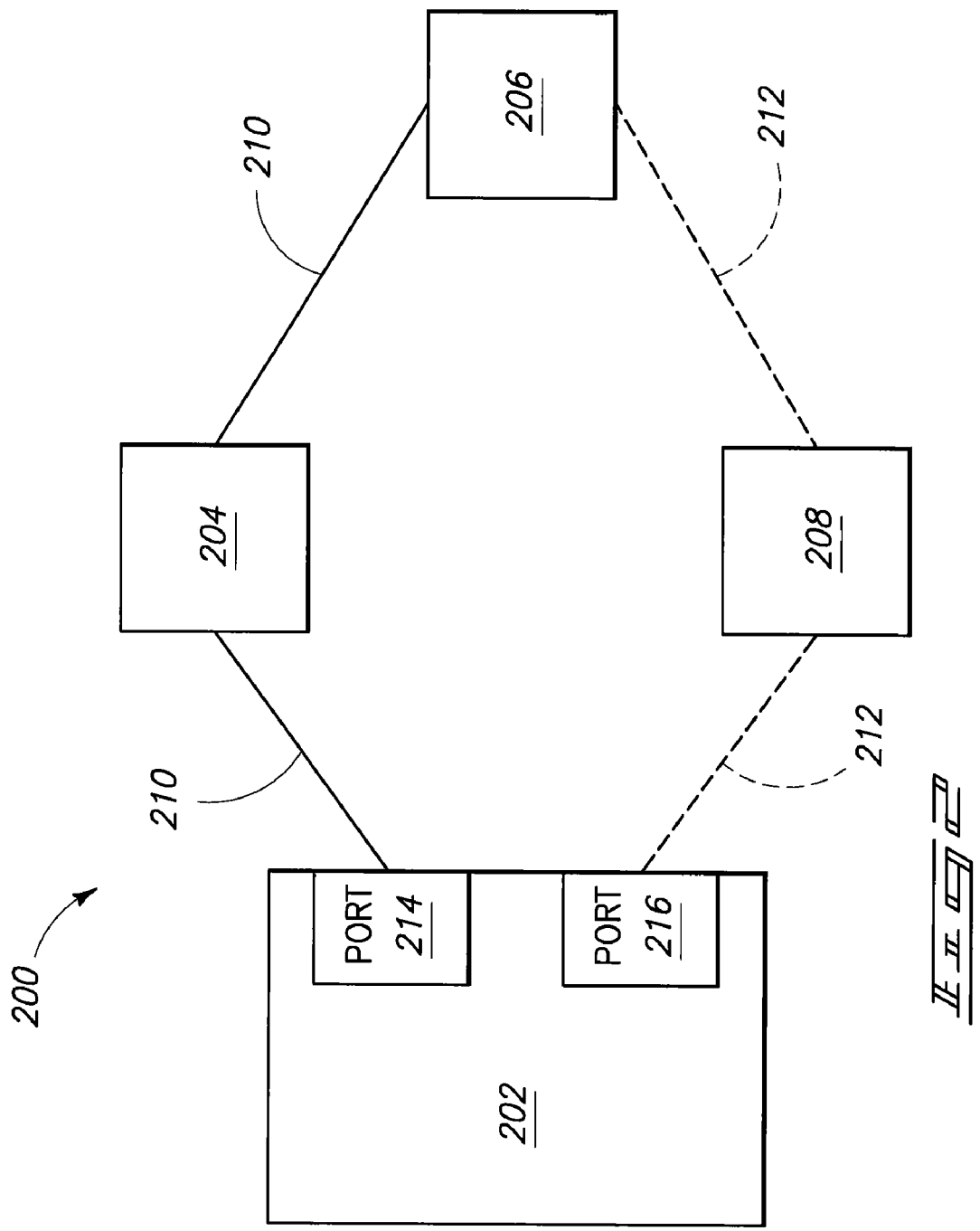
FIG. 2 illustrates a logical representation of a network including two tunnels associated with different ports of a packet switch.
Figure 3:
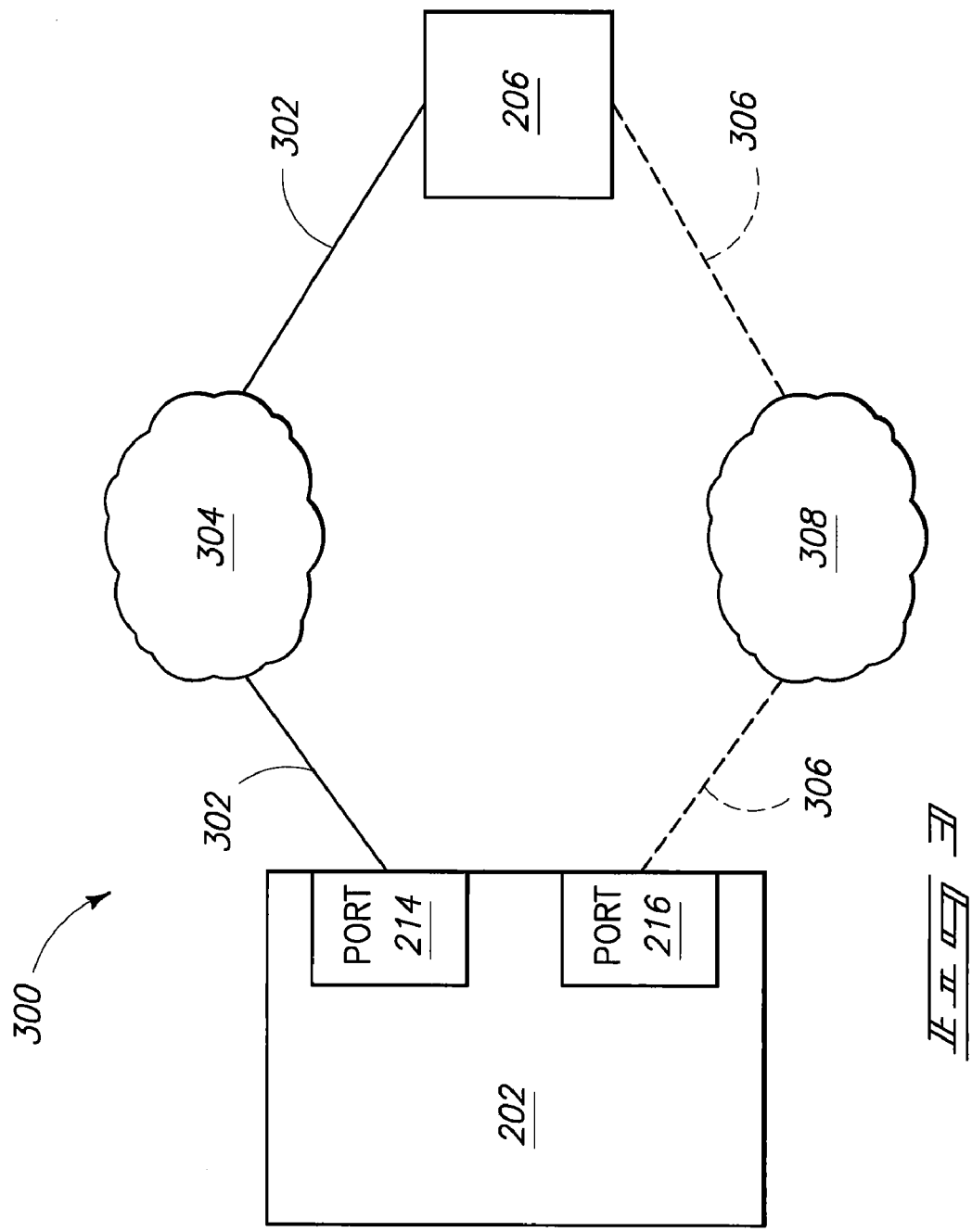
FIG. 3 illustrates another logical representation of a network including two tunnels associated with different ports of a packet switch.

FIGS. 1-3 illustrate, by way of example, the use of primary tunnels and backup tunnels in packet networks. FIG. 1 illustrates a system 100 including five packet switches 102, 104, 106, 108, and 110. Two tunnels 112, 114 may be configured between packet switch 102 and packet switch 108. Tunnel 112 extends from a port 118 of packet switch 102 through packet switch 104 and packet switch 106 to packet switch 108.

Tunnel 114 extends from port 118 of packet switch 102 through packet switch 104 and packet switch 110 to packet switch 108. Tunnel 112 may be designated as primary, and tunnel 114 may be designated as backup. Accordingly, tunnel 112 may be active and may relay packets between packet switch 102 and packet switch 108, and tunnel 114 may be inactive.

Having a primary and backup tunnel may be advantageous in preventing network outages. For example, if a physical link between packet switch 104 and packet switch 106 is disabled, or a control plane or data plane of packet switch 106 fails, tunnel 112 will no longer be able to relay packets between packet switch 102 and packet switch 108. Although a single backup tunnel, tunnel 114, is depicted, additional backup tunnels may be associated with primary tunnel 112 as was described above.

The packet switches of system 100 may be configured to recognize that a tunnel has become disabled and in response change the designations of the disabled tunnel and its corresponding backup tunnel. For example, if tunnel 112 becomes disabled, tunnel 114 may become the primary tunnel and relay packets from packet switch 102 to packet switch 108.

System 100 illustrates a network configuration in which a single link 116 may relay both a primary tunnel and a backup tunnel. In this case, link 116 relays tunnel 112 and tunnel 114 between packet switch 102 and packet switch 104. Between packet switch 104 and packet switch 108, tunnel 112 and tunnel 114 take different paths. These different paths provide redundancy that helps to minimize service interruptions.

FIG. 2 illustrates a system 200 including four packet switches 202, 204, 206, and 208. Packet switch 202 includes two ports 214 and 216. Port 214 relays a tunnel 210 having one endpoint at packet switch 202 and another endpoint at packet switch 206. Tunnel 210 may be a primary tunnel meaning that tunnel 210 is the primary path by which packet switch 202 relays packets to packet switch 206. System 200 also includes another tunnel 212. Tunnel 212 may also relay packets from packet switch 202 to packet switch 206 via packet switch 208.

System 200 may be configured so that tunnel 210 is a primary tunnel and tunnel 212 is a backup tunnel. Accordingly, the packet switches of system 200 may relay packets via tunnel 210 or tunnel 212, but not through both simultaneously. For example, if tunnel 210 is primary, tunnel 212 may be backup. Consequently, packets relayed from packet switch 202 to packet switch 206 will be relayed via tunnel 210.

However, tunnel 212 may still be configured in packet switch 202, packet switch 208, and packet switch 206 so that it may quickly become primary and relay packets. For example, if tunnel 210 becomes disabled, tunnel 212 may quickly become primary and begin relaying packets from packet switch 202 to packet switch 206 via packet switch 208. In some cases, tunnel 212 may relay control packets and/or overhead packets even if tunnel 212 is backup. For example, tunnel 212 may relay continuity check messages (CCMs) conforming to the Institute of Electrical and Electronics Engineers (IEEE) 802.1ag standard to monitor the condition of tunnel 212 even if tunnel 212 is backup.

Tunnel 210 and tunnel 212 may use a common tunnel format. For example, packet switch 202 may modify packets that travel through tunnel 210 to include a VLAN identifier. Tunnel 212 may also use a VLAN identifier. However, tunnel 210 may use a VLAN identifier with a different value than tunnel 212. For example, tunnel 210 may use a VLAN identifier of 100 while tunnel 212 may use a VLAN identifier of 200. In this manner, packets relayed by tunnel 210 will have the same format as packets relayed by tunnel 212, but will have a different value, in this case a VLAN identifier of 100 versus a VLAN identifier of 200. Tunnels having a common format but different values may be typical in situations where a single service provider provides both tunnels.

FIG. 3 illustrates an alternative system 300 for providing a primary tunnel and a backup tunnel between packet switch 202 and packet switch 206. System 300 includes packet switch 202 and packet switch 206 of FIG. 2. In system 300, two different service provider networks 304 and 308 are used to relay packets from packet switch 202 to packet switch 206. A primary tunnel 302 is established between packet switch 202 and packet switch 206 via network 304. Similarly, a backup tunnel 306 is established between packet switch 202 and packet switch 206 via network 308.

System 300 may provide an advantageous configuration for an enterprise having two locations that desires redundant communication paths between the two locations. For example, packet switch 202 may be located in one city and packet switch 206 in another city. The enterprise may lease tunnel 302 between packet switch 202 and packet switch 206 from a service provider that operates network 304 and may lease tunnel 306 between packet switch 202 and packet switch 206 from a second service provider that operates network 308.

Tunnel 302 may be a primary tunnel and tunnel 306 may be a backup tunnel. As was described above, tunnel 306 may relay control messages such as CCM messages even if tunnel 306 is backup.

Since network 304 and network 308 are operated by different service providers, network 304 may use a different tunnel format than network 308. For example, network 304 may be a provider bridging (PB) network in which packets relayed by network 304 comply with a PB format specified by the IEEE 802.1ad standard. In this case, packet switch 202 may modify packets to comply with the PB format prior to forwarding the packets to network 304.

In contrast, network 308 may utilize a different tunnel format. For example, packets relayed by network 308 may have a provider backbone bridging (PBB) format specified by the IEEE 802.1ah standard. Accordingly, packet switch 202 may modify packets to comply with the PBB format prior to forwarding the packets to network 308.

Packet switches, such as the packet switches described above, and packet switch operating methods capable of processing packets associated with tunnels in accordance with the present invention will now be described.

According to one aspect of the invention, a packet switch operating method includes assigning a packet to a virtual interface. The virtual interface is associated with a plurality of tunnels. In some cases, the plurality includes three or more tunnels. The tunnels of the plurality might not be associated with virtual interfaces other than the virtual interface. One of the tunnels is designated a primary tunnel and is configured to accept packets. Another tunnel of the plurality is designated as a backup tunnel and is configured to reject packets. If the plurality includes more than two tunnels, all of the tunnels not designated as a primary tunnel may be designated as backup tunnels.

The method also includes determining which of the plurality of tunnels is the primary tunnel and determining the packet switch port associated with the primary tunnel. The packet is then egressed via the primary tunnel on the packet switch port associated with the primary tunnel.

Assigning the packet to the virtual interface may include assigning the packet to the virtual interface based one or more of a Virtual Local Area Network (VLAN) identifier (VID), an Ethernet Destination Address (DA), an Ethernet Source Address (SA), a layer-three DA, a layer-three SA, a layer-four port number, a layer-two priority, a layer-three priority, a backbone DA, a backbone SA, a backbone VID, a service VID, an instance tag, a tunnel label, a virtual circuit label, a time the packet is received by the packet switch, or a port on which the packet is received by the packet switch.

Assigning the packet to the virtual interface may additionally or alternatively include assigning the packet to the virtual interface based on one or more fields of the packet.

In some cases, the method may involve modifying the packet prior to forwarding the packet to a switching fabric of the packet switch. Accordingly, the method may include determining a transport identifier associated with the primary tunnel, modifying the packet to conform to the transport identifier, and forwarding the modified packet through a switching fabric of the packet switch to the packet switch port associated with the primary tunnel.

In other cases, the method may involve modifying the packet after receiving the packet from the switching fabric. Accordingly, the method may include determining a transport identifier associated with the primary tunnel, receiving the packet from a switching fabric port of the switching fabric, and modifying the received packet to conform to the transport identifier prior to egressing the received packet via the primary tunnel on the packet switch port associated with the primary tunnel. The switching fabric port may be associated with the packet switch port associated with the primary tunnel The transport identifier may be one of at least one of VID, at least one Multiprotocol Label Switching (MPLS) label, a PB identifier, a PBB identifier, a provider backbone transport (PBT) identifier, a provider backbone bridging—traffic engineering (PBB-TE) label, or a Virtual Private LAN Service (VPLS) identifier.

The method may involve using a set of tables to manage the tunnels. In this case, determining which of the plurality of tunnels is the primary tunnel may include consulting a first table. The first table may include a mapping between the virtual interface and a tunnel index associated with the primary tunnel. The tunnel index may be one of a plurality of tunnel indices, each of which is associated with one of the plurality of tunnels.

In addition, determining the packet switch port associated with the primary tunnel may include consulting a second table. The second table may include a plurality of entries, each of which includes a mapping between one of the tunnel indices, one of a plurality of packet switch ports, and one of a plurality of transport identifier indices.

Furthermore, determining the transport identifier associated with the primary tunnel may include consulting a third table. The third table may include a plurality of entries, each of which comprises a mapping between one of the transport identifier indices and one of a plurality of transport identifiers. The transport identifier associated with the primary tunnel may be one of the plurality of transport identifiers.

If the set of three tables is used to manage the tunnels, the set of three tables may also be used to designate a different primary tunnel. In this case, the method may include designating a different tunnel of the plurality to be the primary tunnel by modifying the first table to have a different tunnel index value without modifying the contents of the second table or the third table.

The tunnels may be associated with packet switch ports in a number of different ways. For example, a packet switch port associated with a first one of the tunnels and a packet switch port associated with a second one of the tunnels may be a same packet switch port, as was described above in relation to FIG. 1. The first one of the tunnels and the second one of the tunnels may each be associated with different transport identifiers.

Alternatively, a packet switch port associated with a first one of the tunnels and a packet switch port associated with a second one of the tunnels may be different packet switch ports as was described above in relation to FIG. 2.

Furthermore, the packet switch port associated with the primary tunnel may facilitate the primary tunnel and facilitate at least one backup tunnel associated with a different virtual interface. In this case, the different virtual interface may be associated with a different virtual switch than a virtual switch with which the virtual interface is associated.

Figure 4:
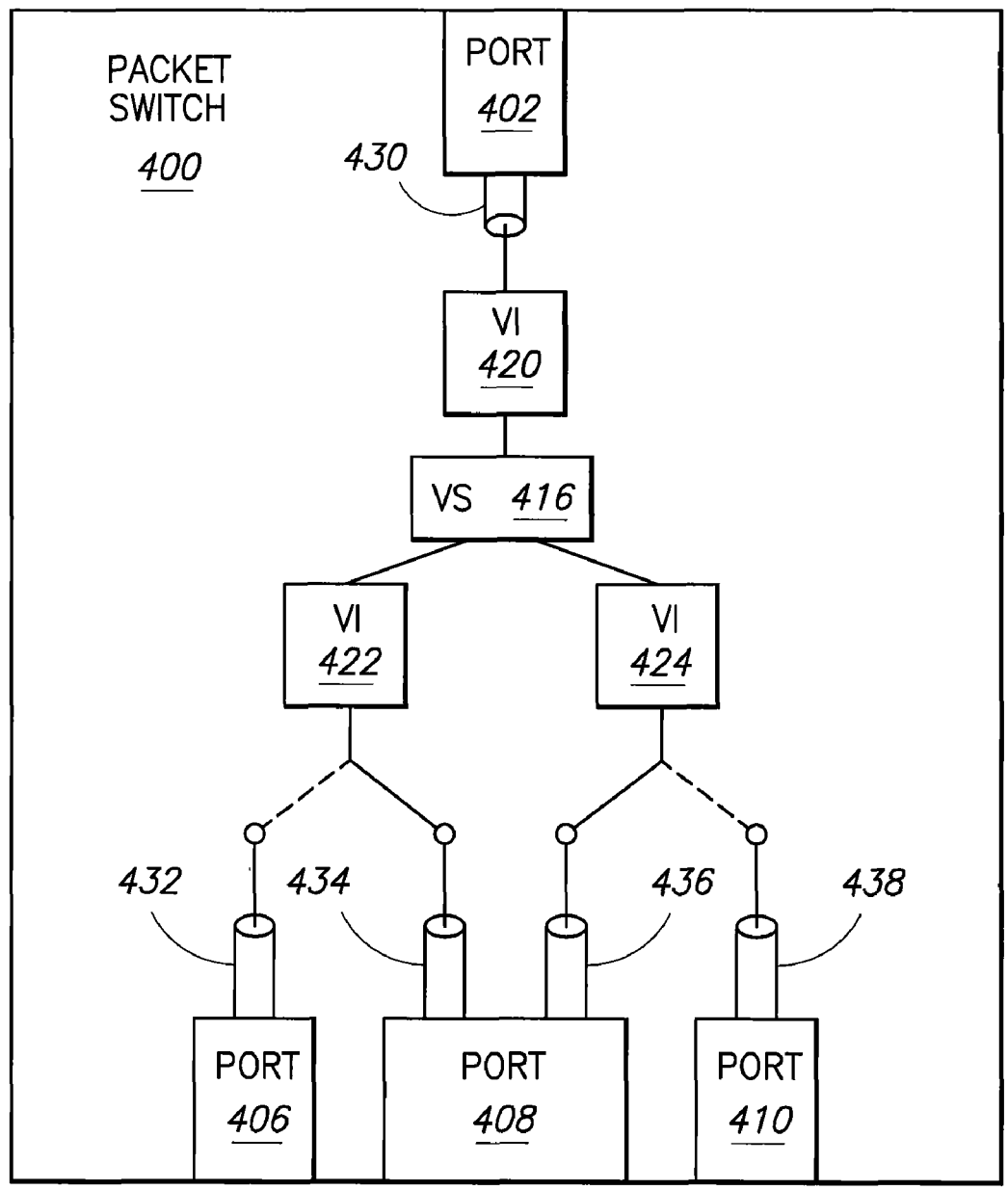
FIG. 4 illustrates a logical representation of a packet switch comprising a plurality of tunnels.

FIG. 4 illustrates a packet switch 400 in accordance with one or more of the aspects of the invention described herein. Packet switch 400 includes four ports, 402, 406, 408, and 410. Packet switch 400 also includes a virtual switch 416. Virtual switch 416 is connected to three virtual interfaces 420, 422, and 424. As was described above, a virtual interface may be associated with one or more tunnels. For example, virtual interface 420 is associated with one tunnel 430, which is associated with port 402. Virtual interface 422, on the other hand, is associated with two tunnels 432 and 434. Tunnel 432 is associated with port 406 and tunnel 434 is associated with port 408.

Virtual interface (VI) 422 may be configured to forward packets either to tunnel 432 or to tunnel 434. In FIG. 4, tunnel 434 is a primary tunnel as indicated by the solid line connecting VI 422 and tunnel 434. Tunnel 432, on the other hand, is a backup tunnel as indicated by the dashed line connecting VI 422 and tunnel 432. Consequently, VI 422 may forward packets to tunnel 434 unless some event causes tunnel 434 to become the backup tunnel and tunnel 432 to become the primary tunnel, after which VI 422 may forward packets to tunnel 432 instead of tunnel 434.

In FIG. 4, the connection between VI 422 and tunnels 432 and 434 is illustrated logically as a two-position switch to convey the fact that VI 422 may be connected to either tunnel 432 or to tunnel 434 but not to both simultaneously. Since tunnel 434 is designated as the primary tunnel (as illustrated by the solid line connecting tunnel 434 and VI 422), VI 422 may forward packets to tunnel 434 but not to tunnel 432, which is designated as the backup tunnel. However, as was described above, even though tunnel 432 is backup (as illustrated by the dashed line connecting tunnel 432 and VI 422), VI 422 may still forward control packets, such as CCM packets, to tunnel 432 to monitor the status of tunnel 432. Although FIG. 4 depicts only two tunnels associated with VI 422, VI 422 may be associated with more than two tunnels. In this case, one of the tunnels may be a designated a primary tunnel and the other tunnels may be designated as backup tunnels.

VI 424, like VI 422, is associated with two tunnels 436 and 438. Tunnel 436, a primary tunnel, is associated with port 408. Thus, port 408 accommodates two tunnels, tunnel 434 and tunnel 436, each of which is associated with a different virtual interface. Tunnel 438 is associated with port 410 and is a backup tunnel.

Packet switch 400 may receive a packet on tunnel 430 of port 402. Upon receiving the packet, packet switch 400 may assign the packet to a virtual switch. FIG. 5 illustrates a table 500 that packet switch 400 may use to assign the packet to a virtual switch. Packet switch 400 may inspect one or more fields of the packet to determine to which virtual switch the packet should be forwarded. Table 500 illustrates a mapping between ports, packet fields, and virtual switches. For example, row 502 illustrates that packets received on port 402 having a service VLAN (S-VLAN) field with a value of 100 are to be mapped to virtual switch 416. Similarly, the other rows of table 500 describe other mappings.

Next, packet switch 400 may assign the packet to a destination virtual interface. FIG. 6 illustrates a table 600 which packet switch 400 may use to determine a virtual interface to which the packet should be forwarded. Packet switch 400 inspects a destination address field of the packet. The destination address field may contain a medium access control (MAC) address. If so, packet switch 400 attempts to find a matching MAC address in one of the rows of the MAC address column of table 600. If a matching MAC address is found, packet switch 400 forwards the packet to the virtual interface specified by the row of the matching MAC address.

For example, row 602 illustrates that if a packet having a destination address of "xABBA" is received, that packet is to be forwarded to VI 422. Similarly, rows 604 through 610 illustrate how other packets having different destination addresses are to be forwarded.

If a packet is received that has a destination address which is not found in table 600, virtual switch 416 may flood the packet to the virtual interfaces of the virtual switch other than the virtual interface on which the packet was received. For example, if a packet is received on VI 420 that has a destination address not found in table 600, VS 416 may flood the packet to both VI 422 and VI 424.

Packet switch 400 may alter a packet prior to transmitting the packet out of a port so that the packet conforms to a particular tunnel format. As was discussed above in relation to FIG. 2, one packet switch port may use a tunnel format and a tunnel value and another packet switch port may use the same tunnel format but a different tunnel value. For example, packets transmitted via tunnel 432 on port 406 and packets transmitted via tunnel 434 on port 408 may conform to a same format but may have different tunnel values.

FIG. 7 illustrates two packet tunnel identifiers 700 and 702 that are intended for use in provider backbone transport networks and that conform to the IEEE 802.1ah standard. Packet tunnel identifier 700 may be used by tunnel 432 and packet tunnel identifier 702 may be used by tunnel 434. Packet tunnel identifier 700 has the same format as packet tunnel identifier 702 since both packet tunnel identifiers have the same fields. However, packet tunnel identifier 702 has a different B-Tag value than packet tunnel identifier 700. Row 704 shows that the B-tag value for packet tunnel identifier 700 is 100. In contrast, row 706 of packet tunnel identifier 702 illustrates that packet tunnel identifier 702 uses a B-tag value of 200. Accordingly, packets transmitted via tunnel 432 may have the same format as packets transmitted via tunnel 434, but may have a different value for one or more of the fields of the common format.

As was discussed above in relation to FIG. 3, one packet switch port may be connected to a first service provider using a first tunnel format and another packet switch port may be connected to a second service provider using a second tunnel format. For example, port 408 may be connected to a PBT network and port 410 may be connected to a VPLS network. Accordingly, packets transmitted via tunnel 436 on port 408 and packets transmitted via tunnel 438 on port 410 may have different tunnel formats.

FIG. 8 illustrates two tunnel formats 800 and 802. Tunnel format 800 is different from tunnel format 802 since the two tunnel formats have different fields and may have different lengths. Tunnel format 800 represents a tunnel format compliant with the IEEE 802.1ah standard and is configured to be used by a PBB network or a PBT network. In contrast, format 802 represents a format designed to be used with a VPLS network.

Returning now to the method implemented above in packet switch 400, once packet switch 400 has forwarded the packet to VI 422, packet switch 400 determines which of the two tunnels associated with VI 422 is the primary tunnel.

FIG. 9 illustrates one way in which packet switch 400 may select a tunnel associated with a virtual interface to which the packet should be forwarded. FIG. 9 includes three tables 900, 902, and 904. Table 900 maintains a relationship between a virtual interface and a tunnel index. For example, row 906 of table 900 specifies that VI 422 is associated with tunnel index 1. The tunnel index may be used in conjunction with table 902.

Row 908 of table 902 illustrates that tunnel index 1 is associated with port 408 and transport identifier index 2. The transport identifier index is used to index a third table, table 904, to determine the format associated with the tunnel. Row 910 of table 904 specifies that packets transmitted with transport identifier index 2 should have a transport identifier including a B-DA of "xABCD," a B-SA of "xFEDD," a B-Tag of 100, and an Instance tag (I-Tag) of 354. By modifying the tunnel index value of a particular row of table 900, the tunnel to which packets associated with a particular virtual interface are forwarded may be altered.

For example, row 906 specifies that tunnel 434 is a primary tunnel since row 906 specifies that VI 422 is associated with tunnel index value 1, which is in turn associated with port 408 and transport identifier index 2. Tunnel 432 could be made a primary tunnel instead of tunnel 434 by modifying row 906 to have a tunnel index value of 2.

Accordingly, designating a new primary tunnel is accomplished by changing a single table entry (the tunnel index). Advantageously, designating a new primary tunnel does not involve modifying the contents of table 902 or 904, which is important since the speed at which packet switch 400 transitions a tunnel from a backup designation to a primary designation partially determines the amount of time during which there is no connectivity via either the primary tunnel or the backup tunnel.

Of course, tables 900, 902, and 904 could be combined in a single table in which table entries such as the port or the transport identifier are modified directly rather than using the tunnel index or the transport identifier index to refer to a port or a transport identifier. However, using a single table might be slower than using three tables since changing entries directly involves writing more data than using an index value.

By way of example, packet switch 400 may receive a packet on port 402 and use table 500 to assign the packet to VS 416. Packet switch 400 may then select VI 422 for the packet using table 600. Next, packet switch 400 may forward the packet to tunnel 434 based on tables 900 and 902 and apply tunnel format specified by row 910 to the packet prior to egressing the packet on port 408 based on table 904.

According to another aspect of the invention, a packet switch operating method includes assigning a packet to a virtual interface. The virtual interface is associated with a plurality of tunnels. The plurality of tunnels may include at least three tunnels. One of the plurality is designated as a primary tunnel and another tunnel of the plurality is designated as a backup tunnel.

The method also includes duplicating the packet. One duplicate is associated with the primary tunnel and another duplicate is associated with the backup tunnel. The duplicate associated with the primary tunnel is egressed via the primary tunnel on a packet switch port associated with the primary tunnel. The duplicate associated with the backup tunnel is discarded.

Each of the plurality of tunnels may have a tunnel format including a transport identifier including at least one of a VID, at least one MPLS label, a PB identifier, a PBB identifier, a PBT identifier, or a VPLS identifier. At least one of the tunnel formats may be an untagged format that does not include a transport identifier.

Each of the plurality of tunnels may be associated with a packet switch port and may have a tunnel format. Each duplicate may be associated with the packet switch port associated with the duplicate's associated tunnel. Furthermore, each duplicate may be associated with the tunnel format associated with the duplicate's associated tunnel.

In some cases, the method may involve modifying the duplicates prior to forwarding the duplicates to a switching fabric. Accordingly, the method may include modifying each duplicate to conform to the duplicate's associated tunnel format and forwarding the modified duplicate to a switching fabric of the packet switch.

In other cases, the method may involve modifying the duplicates after they have been received from a switching fabric. Accordingly, the method may include forwarding each duplicate to a switching fabric port associated with the duplicate's associated packet switch port via a switching fabric of the packet switch, receiving the duplicates from the switching fabric ports, and modifying each received duplicate to conform to the duplicate's associated tunnel format.

The packet switch port associated with the primary tunnel may be a logical port associated with a link aggregation group that includes a plurality of physical ports.

The plurality of tunnels may include two tunnels. A packet switch port associated with the primary tunnel may be a logical port associated with a first link aggregation group. The first link aggregation group may include two or more physical ports. A packet switch port associated with the backup tunnel may be a logical port associated with a second link aggregation group. The second link aggregation group may also include two or more physical ports.

Figure 10:
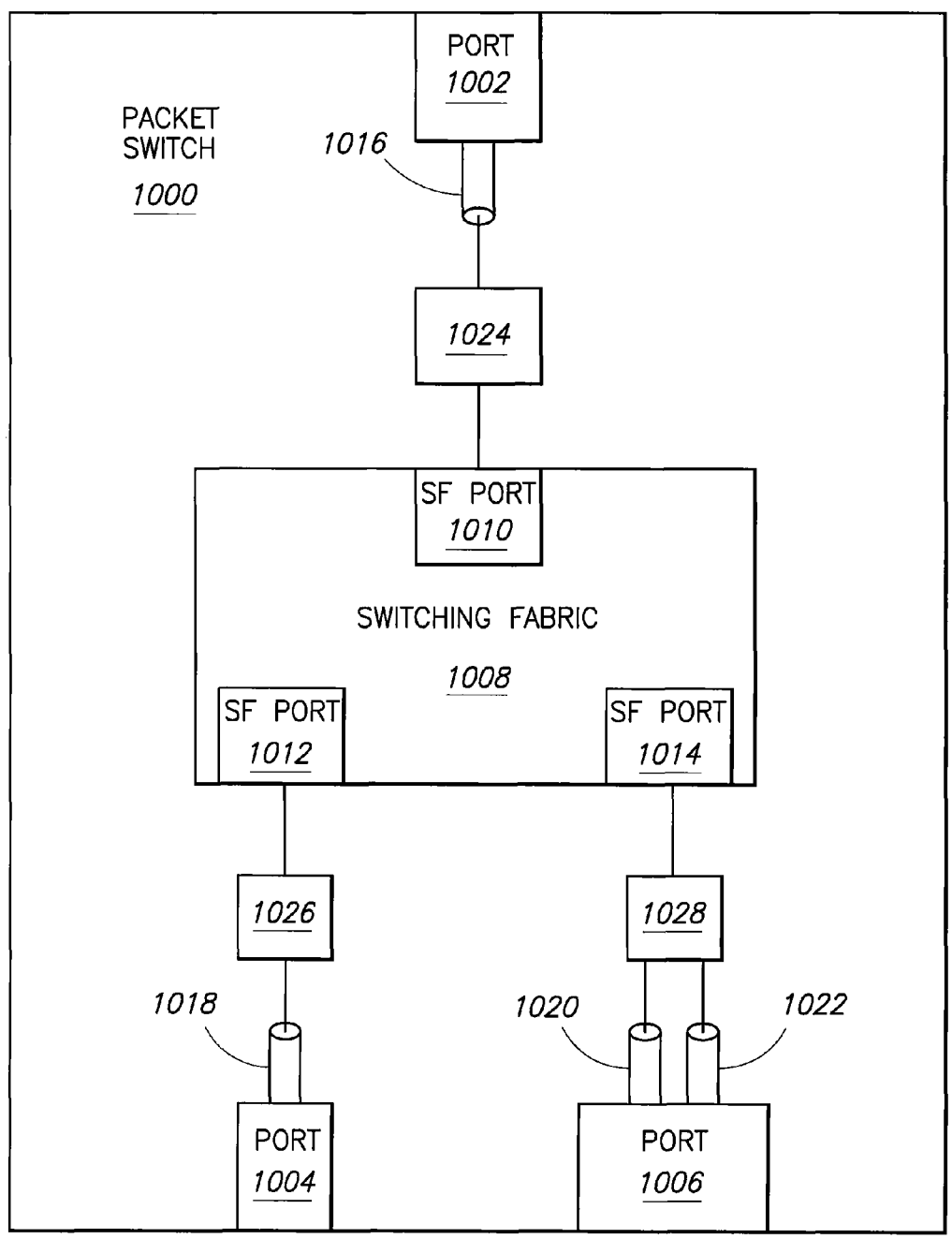
FIG. 10 illustrates a logical representation of a packet switch having a switching fabric.

FIG. 10 illustrates a packet switch 1000 in accordance with one or more of the aspects of the invention described herein.

Packet switch 1000 includes three ports 1002, 1004, and 1006 and a switching fabric 1008. Switching fabric 1008 includes three switching fabric ports 1010, 1012, and 1014. Four tunnels, 1016, 1018, 1020, and 1022, are also illustrated in FIG. 10. Tunnel 1016 is associated with port 1002, tunnel 1018 is associated with port 1004, and tunnels 1020 and 1022 are both associated with port 1006.

Tunnel 1016 is associated with a switching fabric port 1010. A processing module 1024 is logically placed intermediate tunnel 1016 and switching fabric port 1010. Similarly, a second processing module 1026 is logically placed intermediate tunnel 1018 and switching fabric port 1012, and a third processing module 1028 is logically placed intermediate tunnels 1020 and 1022 and switching fabric port 1014.

Packet switch 1000 may receive a packet from port 1002. Packet switch 1000 may then assign the received packet to a virtual interface using the techniques described below in relation to FIG. 13.

The virtual interface may be associated with a plurality of tunnels. For example, the packet received on port 1002 may be assigned to a virtual interface associated with tunnels 1018, 1020, and 1022. Processing module 1024 may duplicate the received packet to create three duplicates, one intended for tunnel 1018, another for tunnel 1020, and another for tunnel 1022. The three duplicates may enter switching fabric port 1010. The duplicate intended for tunnel 1018 may be forwarded to processing module 1026 via switching fabric port 1012. The other two duplicates may egress switching fabric port 1014 and be forwarded to processing module 1028.

Alternatively, the packet received on port 1002 may be forwarded to switching fabric port 1010. Switching fabric 1008 may then create duplicates of the received packet and forward the duplicates. One duplicate may be forwarded via switching fabric port 1012 to processing module 1026, and the other two duplicates may be forwarded via switching fabric port 1014 to processing module 1028.

Further alternatively, packet switch 100 may use a tiered replication scheme in which switching fabric 1008 may send one duplicate of the received packet to processing module 1028 rather than sending two duplicates. Processing module 1028 may then duplicate the duplicate received from switching fabric 1008 so that there is one duplicate for tunnel 1020 and one duplicate for tunnel 1022. In this manner, switching fabric 1008 and processing module 1028 may both perform duplication. This configuration may advantageously reduce the number of packets processed by switching fabric 1008.

The duplicates may be modified to conform to tunnel formats. For example, if processing module 1024 performs the duplication, processing module 1024 may modify the duplicates to conform with tunnel formats associated respectively with tunnels 1018, 1020, and 1022 prior to forwarding the duplicates to switching fabric 1008.

However, if the duplicates increase in length due to the modification, it may be advantageous to modify the duplicates in processing module 1026 and processing module 1028 (after the duplicates have been forwarded by switching fabric 1008). Doing so may reduce the number of bits forwarded by switching fabric 1008 when compared with modifying the duplicates in processing module 1024 prior to forwarding the packets to switching fabric 1008. Furthermore, the duplicates may be modified in processing module 1026 and processing module 1028 if switching fabric 1008 performs duplication of the received packet instead of processing module 1024.

Upon receiving a modified duplicate from switching fabric port 1012, processing module 1026 may determine whether tunnel 1018 is a primary tunnel or a backup tunnel using the techniques described above in relation to FIG. 9. If tunnel 1018 is a primary tunnel, module 1026 may forward the duplicate it received from switching fabric port 1012 to tunnel 1018 and port 1004 may then egress the packet. However, if processing module 1026 determines that tunnel 1018 is a backup tunnel, processing module 1026 may discard the received duplicate.

If processing module 1026 is configured to modify duplicates, upon receiving a duplicate, processing module 1026 may modify the received duplicate to conform to a tunnel format associated with tunnel 1018. Processing module 1026 may then forward the modified duplicate to tunnel 1018 if tunnel 1018 is a primary tunnel. Of course, module 1026 might not modify the duplicate to conform to the tunnel format associated with tunnel 1018 if tunnel 1018 is not a primary tunnel.

However, it may be advantageous for processing module 1026 to modify the duplicate to comply with the tunnel format of tunnel 1018 prior to deciding whether tunnel 1018 is a primary tunnel. For example, in order for packet switch 1000 to reduce the amount of time required to transition a tunnel from a backup status to a primary status, packet switch 1000 may advantageously perform as many of the steps as possible assuming that tunnel 1018 is a primary tunnel even though tunnel 1018 may be a backup tunnel.

This approach may reduce the transition time since if tunnel 1018 is transitioned from a backup tunnel to a primary tunnel, processing module 1026 need only start forwarding packets to tunnel 1018 rather than dropping the packets. This allows for a quick transition time since module 1026 is already modifying packets to conform to the tunnel format of tunnel 1018.

Processing module 1028 may be configured to modify and/or forward duplicates in a manner similar to that described above in relation to processing module 1026.

Figure 11:
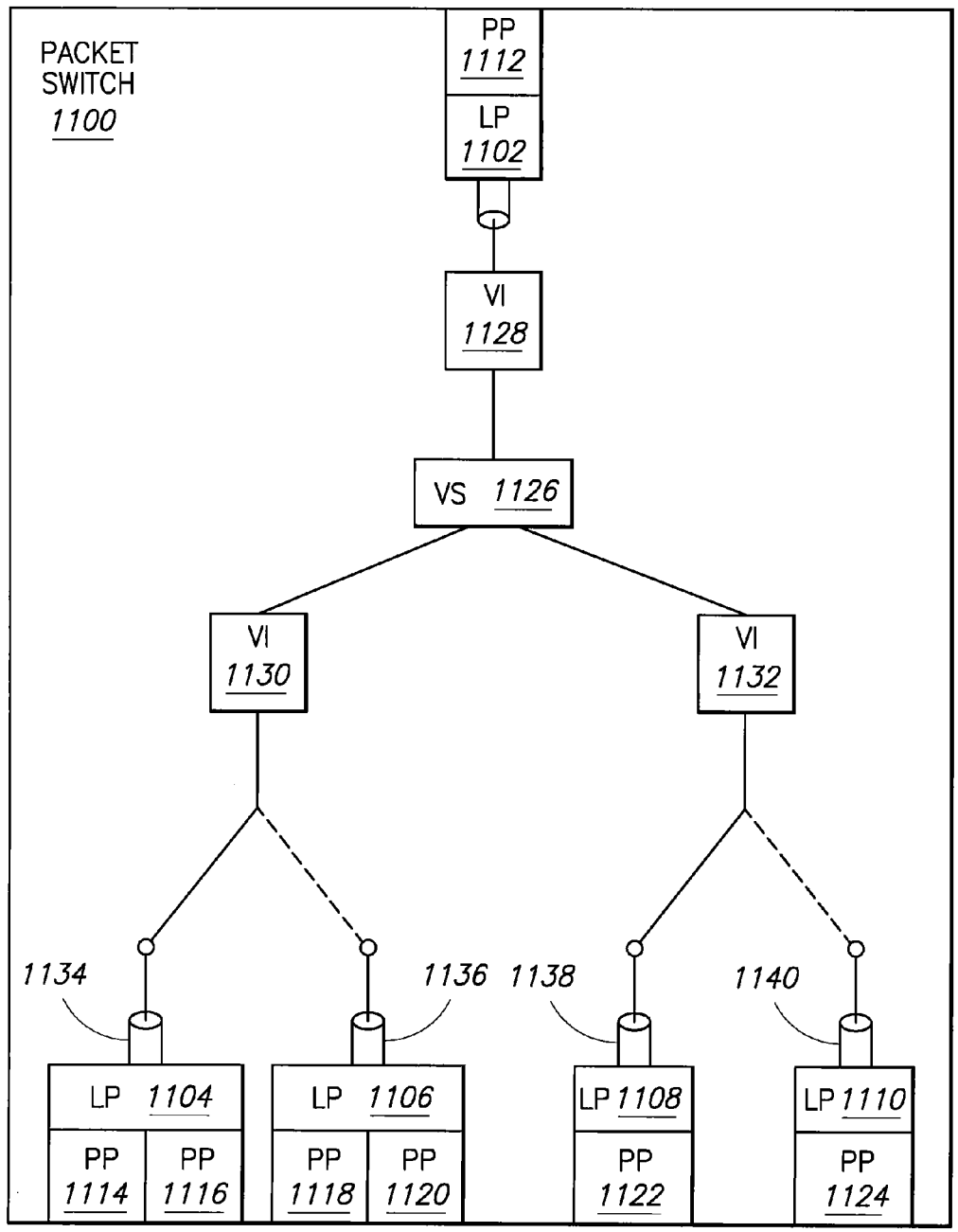
FIG. 11 illustrates a logical representation of a packet switch having logical ports and physical ports.

FIG. 11 illustrates a packet switch 1100 having both physical ports and logical ports. Packet switch 1100 includes logical ports 1102, 1104, 1106, 1108, and 1110. Each logical port is associated with at least one physical port. For example, logical port 1102 is associated with physical port 1112. Logical port 1104 is associated with two physical ports, physical port 1114 and physical port 1116.

A logical port, for example logical port 1104, may represent an Ethernet link aggregation group. Logical port 1104 may forward packets on either of physical port 1114 or physical port 1116 since these physical ports are the ports comprising the link aggregation group. In this manner, logical port 1104 may be capable of relaying an amount of traffic greater than the amount that a single physical port could relay. For example, if physical port 1112 is able to operate at up to one gigabit per second, then logical port 1102 will also be limited to transmitting or receiving at a rate of one gigabit per second. In contrast, logical port 1104 may operate at up to two gigabits per second if physical port 1114 operates at one gigabit per second and physical port 1116 also operates at one gigabit per second.

Logical port 1106 is also associated with two physical ports, physical port 1118 and physical port 1120. Logical ports 1108 and 1110 are each associated with a single physical port, physical port 1122, and physical port 1124, respectively.

Packet switch 1100 also includes a virtual switch 1126 associated with three virtual interfaces 1128, 1130, and 1132. Virtual interface 1128 is associated with a single tunnel. Virtual interface 1130 is associated with two tunnels, tunnel 1134 and tunnel 1136. Similarly, virtual interface 1132 is associated with two tunnels, tunnel 1138 and tunnel 1140.

Note that virtual interface 1130 is associated with tunnels 1134 and 1136, and tunnels 1134 and 1136 are each associated with two physical ports. This provides a primary tunnel (tunnel 1134) and a backup tunnel (tunnel 1136) that have the same bandwidth capability if physical ports 1114, 1116, 1118, and 1120 each have the same bandwidth capability. This is so because tunnel 1134 is associated with two physical ports as is tunnel 1136.

However, a primary tunnel and a backup tunnel may have different capacities. For example, tunnel 1134 may be a primary tunnel associated with two physical ports, but tunnel 1136 could be a backup tunnel tied to a single physical port (rather than two physical ports as depicted in FIG. 11) so that tunnel 1136 has half the bandwidth capacity of tunnel 1134. This may be advantageous in that it provides backup in the case of an outage so that high priority traffic and/or premium services can continue to flow, but may reduce cost by reducing the number of physical links between devices.

Although the discussion herein relates primarily to the transmission of packets with respect to primary and backup tunnels, the various aspects of the invention also include processing packets received on primary and backup tunnels.

According to another aspect of the invention, a packet switch operating method includes receiving a packet from a port of the packet switch. The packet switch associates a tunnel with the received packet based on the port and based on fields of the received packet. The tunnel is one of a plurality of tunnels associated with a virtual interface.

One of the plurality of tunnels is designated as a primary tunnel and any other of the plurality of tunnels is designated as a backup tunnel. If the associated tunnel is the primary tunnel, the packet switch forwards the received packet to a virtual switch via the virtual interface. If the associated tunnel is the backup tunnel, the packet switch discards the received packet.

The received packet may include a transport identifier including one of at least one VLAN identifier, at least one MPLS label, a PB identifier, a PBB identifier, a PBT identifier, or a VPLS identifier. Alternatively, the received packet might not include a transport identifier.

Associating the tunnel with the received packet based on the fields of the received packet may include associating the tunnel based on a VID, an Ethernet DA, an Ethernet SA, a layer-three DA, a layer-three SA, a layer-four port number, a layer-two priority, a layer-three priority, a backbone DA, a backbone SA, a backbone VID, a service VID, an instance tag, a tunnel label, or a virtual circuit label. Furthermore, associating the tunnel may be based on a combination of two or more of these fields, a combination of one or more of these fields and one or more other packet fields, or one or more other packet fields.

Discarding the received packet when the associated tunnel is the backup tunnel may include discarding the received packet prior to forwarding the received packet to a virtual switch or a switching fabric of the packet switch. Doing so may advantageously reduce the number of packets processed by the switching fabric.

Figure 12:
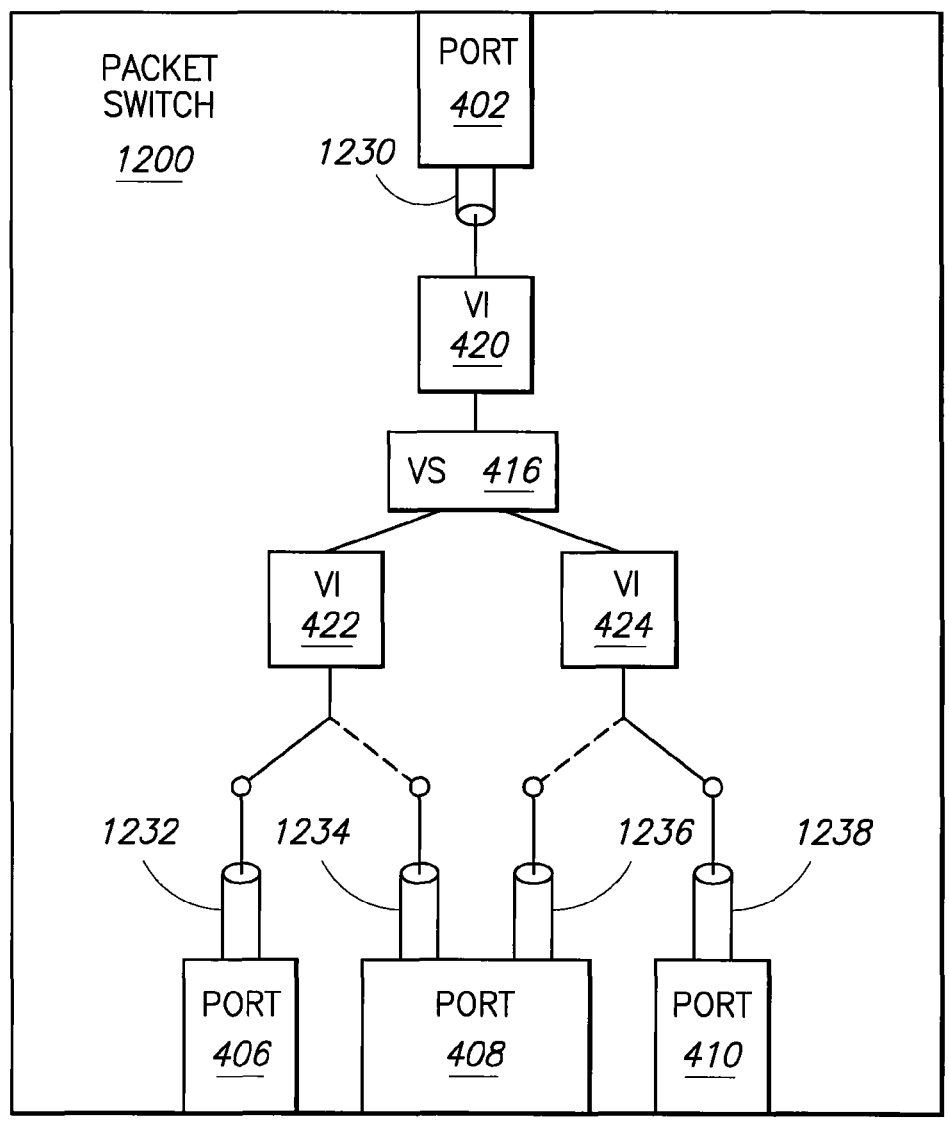
FIG. 12 illustrates another logical representation of a packet switch comprising a plurality of tunnels.

FIG. 12 illustrates packet switch 1200, which is similar to packet switch 400 of FIG. 4 since it has the same virtual switches, virtual interfaces, and ports as packet switch 400. However, packet switch 1200 has different tunnels than packet switch 400.

In the description of packet switch 400 above, the tunnels of packet switch 400 were generally described as being uni-directional. For example, tunnel 430 was described as being used to ingress packets into a virtual switch and tunnels 432, 434, 436, and 438 were described as being used to egress packets out of packet switch 400. Although the tunnels of packet switch 400 have been described as unidirectional, in general tunnels may alternatively be bidirectional tunnels capable of ingressing and egressing packets.

Tunnels 1230, 1232, 1234, 1236, and 1238 of packet switch 1200 are uni-directional tunnels that are complementary to tunnels 430, 432, 434, 436, and 438. In other words, tunnel 1230 is an egress tunnel and tunnels 1232, 1234, 1236, and 1238 are ingress tunnels.

FIG. 13 illustrates a table 1300 that packet switch 1200 may use in associating a received packet with a tunnel. Packet switch 1200 may search column 1302 of table 1300 to find a port the packet was received on. Next, packet switch 1200 may attempt to match fields of the received packet, or more particularly, fields of a transport identifier of the received packet, with one of the rows of column 1304 that is associated with the matching port. If packet switch 1200 finds a matching row, packet switch 1200 associates the received packet with the virtual switch, virtual interface, and tunnel specified by the matching row.

For example, if packet switch 1200 receives a packet on port 406 having an S-VLAN value of 300, packet switch 1200 will associate the received packet with VS 416, VI 422, and tunnel 1232 based on row 1306 of table 1300.

In some cases, the packet might not include a transport identifier. Accordingly, packet switch 1200 may detect the lack of a transport identifier and assign the packet to a particular tunnel based on the lack of a transport identifier. For example, row 1308 of table 1300 specifies that packets received on port 410 having no C-VLAN field are to be associated with VS 416, VI 424, and tunnel 1238.

By way of example, if packet switch 1200 receives a packet on port 406 that packet switch 1200 associates with tunnel 1232, packet switch 1200 may determine that tunnel 1232 is a primary tunnel and subsequently forward the packet to virtual switch 416 via virtual interface 422. In contrast, if packet switch 1200 receives a packet on port 408 that packet switch 1200 associates with tunnel 1234, packet switch 1200 may determine that tunnel 1234 is a backup tunnel and subsequently drop the packet instead of forwarding the packet to virtual switch 416 via virtual interface 422. Packet switch 1200 may determine whether a tunnel is primary or backup using the methods described above in relation to FIG. 9.

Discarding packets associated with backup tunnels may advantageously ensure that backup tunnels are not used to relay packets other than control packets such as CCM messages. CCM messages may be relayed by backup tunnels to monitor the backup tunnels. The CCM messages may be used to determine whether the backup tunnels are operational and therefore capable of becoming primary.

Packet switch operating methods and packet switches capable of implementing primary and backup tunnels have been described above. What follows is a description of aspects of the invention involving transitioning a tunnel.

According to yet another aspect of the invention, a packet switch operating method includes transmitting packets associated with a first virtual interface on a port via a first tunnel, and transmitting packets associated with a second virtual interface on the port via a second tunnel. The packet switch disables the first tunnel and then transmits subsequent packets associated with the first virtual interface via a third tunnel instead of the first tunnel. After disabling the first tunnel, the packet switch maintains transmission of subsequent packets associated with the second virtual interface on the port via the second tunnel.

Disabling the first tunnel may include preventing packets from being transmitted on the port via the first tunnel, and may further include preserving a configuration of the first tunnel effective to allow the packet switch to subsequently enable the first tunnel without re-configuring the first tunnel. This may advantageously reduce the amount of time required to change the status of a tunnel from enabled to disabled or from disabled to enabled.

The third tunnel might not be enabled until the first tunnel is disabled. This may advantageously ensure that the third tunnel and the first tunnel are not simultaneously enabled.

The method may also include detecting that the first tunnel is no longer operational prior to disabling the first tunnel. For example, the packet switch may detect that the first tunnel is no longer operational by detecting that Ethernet CCM messages are not being received.

The method may also include receiving a notification that the first tunnel is no longer operational prior to disabling the tunnel, for example, from another packet switch. The notification may be a message in accordance with the IEEE 802.1ag standard.

In some cases, the first tunnel and the third tunnel may both be associated with the same port. In this respect, the first tunnel and the third tunnel may be similar to tunnel 112 and tunnel 114 of FIG. 1 since tunnels 112 and 114 are both associated with port 118. Accordingly, transmitting subsequent packets associated with the first virtual interface may include transmitting subsequent packets on the port via the third tunnel.

In other cases, the first tunnel and the third tunnel may be associated with different ports. In this respect, the first tunnel and the third tunnel may be similar to tunnel 210 and tunnel 212 of FIG. 2 since tunnels 210 and 212 are associated with different ports of packet switch 202. Accordingly, transmitting subsequent packets associated with the first virtual interface may comprise transmitting subsequent packets on a different port via the third tunnel.

The transport identifiers of the first, second, and third tunnels may have a variety of configurations. For example, the packets transmitted via the first tunnel may include a first transport identifier, the packets transmitted via the second tunnel may include a second transport identifier, and the packets transmitted via the third tunnel may comprise a third transport identifier.

In another example configuration, the first transport identifier and the third transport identifier may both conform to a common format but may have different values. In this respect, the first transport identifier and second transport identifier are similar to the transport identifiers of FIGS. 2 and 7 described above. Alternatively, the first transport identifier and the second transport identifier may conform to different formats as illustrated above in relation to FIGS. 3 and 8.

Although they are associated with the same virtual interface, the first transport identifier and the third transport identifier may conform to different formats. Alternatively, the first transport identifier format may be the same as the third transport identifier format.

Although the packet switches illustrated in FIGS. 4, 11, and 12 are illustrated as if they have a single virtual switch, packet switches in the various aspects of the invention may include a plurality of virtual switches. Accordingly, the first virtual interface may be associated with a different virtual switch than the second virtual interface. Alternatively, the first virtual interface and the second virtual interface may be associated with a same virtual switch.

Packet switch 400 of FIG. 4 illustrates that port 408 may transmit packets associated with tunnel 434 and packets associated with tunnel 436. Subsequently, tunnel 432 may become the primary tunnel and tunnel 434 may become the backup tunnel. Consequently, packets associated with VI 422 may be transmitted by port 406 via tunnel 432 instead of port 408 via tunnel 434. However, even though tunnel 434 becomes a backup tunnel, port 408 continues to transmit packets associated with tunnel 436, since tunnel 436 is still a primary tunnel for VI 424.

According to another aspect of the invention, a packet switch operating method includes storing an association between a virtual interface and a tunnel index. The tunnel index has a value associated with a first tunnel and the first tunnel is associated with a first packet switch port. The first tunnel is also associated with a first transport identifier. The packet switch egresses packets associated with the virtual interface via the first tunnel on the first packet switch port. The packets include the first transport identifier.

The packet switch then modifies the tunnel index to have a value associated with a second tunnel. The second tunnel is associated with a second packet switch port and a second transport identifier. The packet switch egresses packets received subsequent to changing the tunnel index that are associated with the virtual interface via the second tunnel on the second packet switch port. These packets include the second transport identifier.

As was described above in relation to FIG. 6, the packet switch may use a table of learned field values when determining to which of a plurality of virtual interfaces associated with a virtual switch a packet should be forwarded. In some cases, the same table of learned field values may be used both prior to a tunnel status change and subsequent to a tunnel status change. Advantageously, this may reduce the amount of time required for a tunnel status change.

Accordingly, the method according to this aspect of the invention may include receiving packets prior to modifying the tunnel index and determining that a portion of the packets received prior to modifying the tunnel index are associated with the virtual interface. This determination may be made based on a stored set of packet field values learned from packets received via the virtual interface prior to modifying the tunnel index. For example, the stored set of packet field values learned from packets may be a table, such as table 600 described above in relation to FIG. 6.

The method may also include receiving packets after modifying the tunnel index and determining that a portion of the packets received after modifying the tunnel index are associated with the virtual interface based on the stored set of packet field values. In other words, the same stored set of packet field values may be used prior to modifying the tunnel index and subsequent to modifying the tunnel index. The packet field values stored in the set may be Ethernet source addresses.

In some cases, the first packet switch port and the second packet switch port may be the same packet switch port. In this respect, the first tunnel and the second tunnel may be similar to tunnel 112 and tunnel 114 of FIG. 1 since tunnels 112 and 114 are both associated with port 118.

In other cases, the first packet switch port and the second packet switch port may be different packet switch ports. In this respect, the first tunnel and the second tunnel may be similar to tunnel 210 and tunnel 212 of FIG. 2 since tunnels 210 and 212 are associated with different ports of packet switch 202.

Although the packet switches illustrated in FIGS. 1-4 and 10-12 are illustrated logically as boxes, the illustrated packet switches may take a number of different physical forms. For example, a single packet switch may include a plurality of blades including control blades, fabric blades, and/or port blades. Further, two physically distinct packet switch chassis may make up a single logical packet switch when the two physically distinct chassis are logically controlled by a single entity.

Accordingly, the first packet switch port may be located on one blade of the packet switch, and the second packet switch port may be located on a different blade of the packet switch. Furthermore, the first packet switch port may be located in one chassis of the packet switch, and the second packet switch port may be located in a different chassis of the packet switch. The two chassis may be logically chained together to form a single logical packet switch.

According to yet another aspect of the invention, a packet switch operating method includes provisioning a plurality of tunnels on a packet switch by associating each of the plurality of tunnels with a packet switch port. The plurality of tunnels may consist of two tunnels. In some cases the plurality of tunnels may consist of more than two tunnels. Provisioning also includes configuring the packet switch to modify packets relayed by the tunnel to include a transport identifier associated with the tunnel. The tunnels of the plurality are configured to relay packets when permitted by a tunnel index. The plurality of tunnels and the tunnel index are associated with a virtual interface.

Provisioning the packet switch may involve sending the packet switch a configuration file or configuring the packet switch using simple network management commands, extensible markup language commands, or other commands designed to configure the packet switch. Provisioning may be accomplished manually by a user or automatically by a network management system or an element management system.

The method also includes permitting a first tunnel of the plurality of tunnels to relay packets by configuring the tunnel index to indicate the first tunnel. The tunnel index indicates only one tunnel at a time.

The method also includes enabling a second tunnel of the plurality of tunnels to relay packets by configuring the tunnel index to indicate the second tunnel, thereby preventing the first tunnel from relaying packets.

The method may use tables 900, 902, and 904 described above in relation to FIG. 9 to modify the tunnel index. As was discussed above, by modifying only the tunnel index value in table 900, the packet switch may simultaneously enable one tunnel and disable another. The ability to transition between tunnels by changing a single value, the tunnel index value, advantageously reduces the time required to transition between tunnels.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
   a packet switch assigning a packet to a virtual interface, the virtual interface being associated with a plurality of tunnels, one of the plurality being designated a primary tunnel configured to accept packets and another tunnel of the plurality being designated as a backup tunnel configured to reject packets;
   the packet switch determining which of the plurality of tunnels is the primary tunnel by consulting a mapping between the virtual interface and a tunnel index associated with the primary tunnel, the tunnel index being one of a plurality of tunnel indices, each of which is associated with one of the tunnels of the plurality;
   the packet switch determining a packet switch port associated with the primary tunnel by consulting a mapping between the tunnel index associated with the primary tunnel, one of a plurality of packet switch ports, and one of a plurality of transport identifier indices; and
   the packet switch egressing the packet via the primary tunnel on the packet switch port associated with the primary tunnel.

2. The method of claim 1 wherein the assigning the packet to the virtual interface comprises assigning the packet to the virtual interface based on one or more of a VLAN Identifier (VID), an Ethernet Destination Address (DA), an Ethernet Source Address (SA), a layer-three DA, a layer-three SA, a layer-four port number, a layer-two priority, a layer-three priority, a backbone DA, a backbone SA, a backbone VID, a service VID, a time the packet is received by the packet switch, or a port on which the packet is received by the packet switch.

3. The method of claim 1 wherein the assigning the packet to the virtual interface comprises examining contents of one or more fields of the packet and assigning the packet to the virtual interface based on the one or more fields of the packet.

4. The method of claim 1 further comprising:
   determining a transport identifier associated with the primary tunnel;
   modifying the packet to conform to the transport identifier; and
   forwarding the modified packet through a switching fabric of the packet switch to the packet switch port associated with the primary tunnel.

5. The method of claim 1 further comprising:
   determining a transport identifier associated with the primary tunnel; and
   modifying the packet to conform to the transport identifier prior to the egressing of the packet via the primary tunnel on the packet switch port associated with the primary tunnel.

6. The method of claim 5 wherein the transport identifier comprises one of at least one VLAN identifier, at least one Multiprotocol Label Switching (MPLS) label, a provider bridging (PB) identifier, a provider backbone bridging (PBB) identifier, a provider backbone transport (PBT) identifier, a provider backbone bridging—traffic engineering (PBB-TE) label, or a Virtual Private LAN Service (VPLS) identifier.

7. The method of claim 5 wherein:
   the determining which of the plurality of tunnels is the primary tunnel comprises consulting a first table, the first table including the mapping between the virtual interface and a tunnel index associated with the primary tunnel;
   the determining the packet switch port associated with the primary tunnel comprises consulting a second table, the second table including a plurality of entries, each of which comprises a mapping between one of the tunnel indices, one of the plurality of packet switch ports, and one of the plurality of transport identifier indices; and
   the determining the transport identifier associated with the primary tunnel comprises consulting a third table, the third table including a plurality of entries, each of which comprises a mapping between one of the transport identifier indices and one of a plurality of transport identifiers, the transport identifier associated with the primary tunnel being one of the plurality of transport identifiers.

8. The method of claim 7 further comprising designating a different tunnel of the plurality to be the primary tunnel by modifying the first table to have a different tunnel index value without modifying the contents of the second table or the third table.

9. The method of claim 1 wherein a packet switch port associated with a first one of the tunnels and a packet switch port associated with a second one of the tunnels are a same packet switch port and the first one of the tunnels and the second one of the tunnels are each associated with different transport identifiers relative to one another, the different transport identifiers comprising different fields relative to one another.

10. The method of claim 9 wherein the different transport identifiers have different lengths relative to one another.

11. The method of claim 1 wherein a packet switch port associated with a first one of the tunnels and a packet switch port associated with a second one of the tunnels are different packet switch ports.

12. The method of claim 1 wherein the packet switch port facilitates the primary tunnel and the packet switch port also facilitates at least one backup tunnel associated with a different virtual interface.

13. The method of claim 12 wherein the virtual interface is associated with a virtual switch and the different virtual interface is associated with a different virtual switch.

14. A packet switch configured to implement the method of claim 1.

15. A packet switch operating method comprising:
a packet switch receiving an Ethernet packet from either a primary Ethernet packet tunnel or a backup Ethernet packet tunnel via a port of the packet switch;
the packet switch determining whether the Ethernet packet was received on the primary Ethernet packet tunnel or the backup Ethernet packet tunnel by consulting a first mapping between the port via which the Ethernet packet was received, fields of the received Ethernet packet and a tunnel index associated with the tunnel from which the Ethernet packet was received and by consulting a second mapping between the tunnel index and a virtual interface of the packet switch, the primary Ethernet packet tunnel and backup Ethernet packet tunnel both being associated with the virtual interface of the packet switch;
if the packet switch determines that the Ethernet packet was received on the primary Ethernet packet tunnel, forwarding the received packet to a virtual switch of the packet switch via the virtual interface; and
if the packet switch determines that the Ethernet packet was received on the backup Ethernet packet tunnel, discarding the received packet.

16. The method of claim 15 wherein the received packet includes a transport identifier comprising one of at least one VLAN identifier, at least one MPLS label, a PB identifier, a PBB identifier, a PBT identifier, PBB-TE label, or a VPLS identifier.

17. The method of claim 15 wherein the received packet does not include a transport identifier.

18. The method of claim 15 wherein the determining comprises determining based on a VID, an Ethernet DA, an Ethernet SA, a layer-three DA, a layer-three SA, a layer-four port number, a layer-two priority, a layer-three priority, a backbone DA, a backbone SA, a backbone VID, or a service VID.

19. The method of claim 15 wherein the discarding the received packet comprises discarding the received packet prior to forwarding the received packet to a virtual switch or a switching fabric of the packet switch.

20. A packet switch configured to implement the method of claim 15.

21. The method of claim 15 further comprising after the receiving of the Ethernet packet, parsing the received Ethernet packet to extract values stored by the fields of the received Ethernet packet and wherein the determining comprises determining based on the extracted values.

22. The method of claim 15 wherein when the primary Ethernet packet tunnel is active, the backup Ethernet packet tunnel is inactive and further comprising:
the packet switch monitoring an ability of the primary Ethernet packet tunnel to relay packets; and
based on the monitoring, the packet switch disabling the primary Ethernet packet tunnel and enabling the backup Ethernet packet tunnel.

23. The method of claim 15 wherein an endpoint of the primary Ethernet packet tunnel and an endpoint of the backup Ethernet packet tunnel are both located on the packet switch.

24. A packet switch operating method comprising:
a packet switch receiving an Ethernet packet;
the packet switch examining fields of the Ethernet packet;
the packet switch assigning the packet to a virtual interface of a virtual switch of the packet switch based on the examining of the fields, the virtual interface being associated with a plurality of Ethernet packet tunnels, one of the plurality being designated an active primary Ethernet packet tunnel extending from the packet switch to a destination device and configured to accept packets and relay the accepted packets to the destination device and another tunnel of the plurality being designated as an inactive backup Ethernet packet tunnel extending from the packet switch to the destination device and configured to reject packets wherein the primary tunnel is associated with a first transport identifier and the backup tunnel is associated with a second transport identifier and wherein the first transport identifier and second transport identifier comprise different fields relative to one another;
the packet switch determining which of the plurality of tunnels is the primary tunnel by consulting a mapping between the virtual interface and a tunnel index associated with the primary tunnel;
the packet switch determining a packet switch port associated with the primary tunnel by consulting a mapping between the index tunnel associated with the primary tunnel and the packet switch port; and
egressing the packet via the primary tunnel on the packet switch port associated with the primary tunnel.

* * * * *